Figure 1:
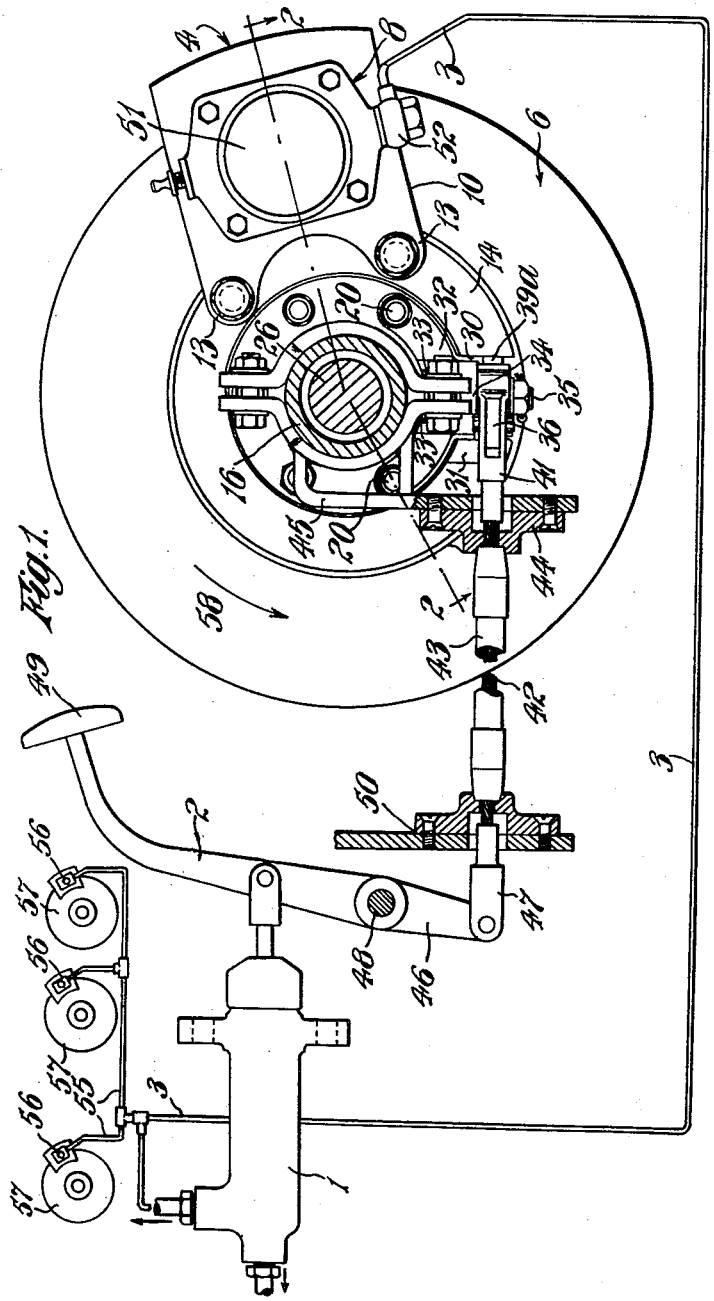

July 17, 1962

H. J. BUTLER 3,044,580

BRAKING SYSTEM

Filed April 16, 1958

4 Sheets-Sheet 1

INVENTOR
Henry James Butler
by Benj. T. Pauler
his attorney

July 17, 1962 H. J. BUTLER 3,044,580
BRAKING SYSTEM
Filed April 16, 1958 4 Sheets-Sheet 4

INVENTOR
Henry James Butler
by Benj. T. Rauber
his attorney

United States Patent Office 3,044,580
Patented July 17, 1962

3,044,580
BRAKING SYSTEM
Henry James Butler, Beechcroft, Sutton Coldfield, England, assignor to Dunlop Rubber Company Limited, London, England, a British company
Filed Apr. 16, 1958, Ser. No. 728,962
Claims priority, application Great Britain Apr. 17, 1957
10 Claims. (Cl. 188—140)

This invention relates to braking systems for motor vehicles, and more particularly relates to braking systems for a motor car incorporating mechanical servo means to provide brake pedal assistance. It also relates to a servo brake whereby the mechanical servo effect is originated.

With the greater weights and speeds of certain modern cars it has been found that the conventional braking system incorporating a foot-pedal operated master-cylinder is not sufficient to provide adequate braking characteristics and that in consequence it is necessary to provide some form of servo mechanism to assist the driver in braking the vehicle. One of the most current of these mechanisms is a vacuum-operated servo, but while this is effective it is unduly heavy and is expensive to produce.

One object of the present invention is to provide an improved braking system for motor vehicles which is light in weight, cheap to produce and is capable of giving adequate braking pedal assistance.

A further object of the invention is to provide a servo brake for a servo-assisted braking system of the above kind.

Also, according to the present invention a brake comprises a friction member movable into frictional engagement with a rotatable member and which is mounted on a supporting member having limited angular movement in the direction of rotation of said rotatable member upon said frictional engagement being effected. The friction member is moved into engagement with the rotatable member by a pedal, lever or like means. Rocking means associated with said supporting member and operable by said angular movement actuates a mechanical linkage between said rocking means and said pedal, lever or like means to transmit to said pedal, lever or like means additional force to increase the frictional engagement between said friction means and said rotatable member.

The rotatable members and the brake-applying mechanism may be an adaptation of any suitable type of such mechanisms currently known. Application of all the brakes may be either by fluid-pressure or mechanical means. The rotatable means, friction means and pressure mechanism for the servo brake may themselves constitute one of the normal wheel brakes. The servo brake may form a portion of an original braking-equipment system or may be fitted in substitution for one of the conventional brakes of an existing braking system.

Further, according to the invention, a brake for a braking system comprising one or more rotatable members each having associated therewith a non-rotatable friction member and means for forcing each said friction member into frictional engagement with a rotatable member, comprises a brake as hereinabove described.

Also, according to the invention, a braking system for a vehicle comprises one or more wheel brakes each comprising a rotatable member, a non-rotatable friction member and means for forcing said friction member into frictional engagement with said rotatable member and a further brake as hereinabove defined, said further brake being operatively associated with said wheel brakes whereby said angular movement of the non-rotatable member of said further brake is adapted to increase the frictional engagement between the friction member and rotatable member of said wheel brakes.

Figure 2:
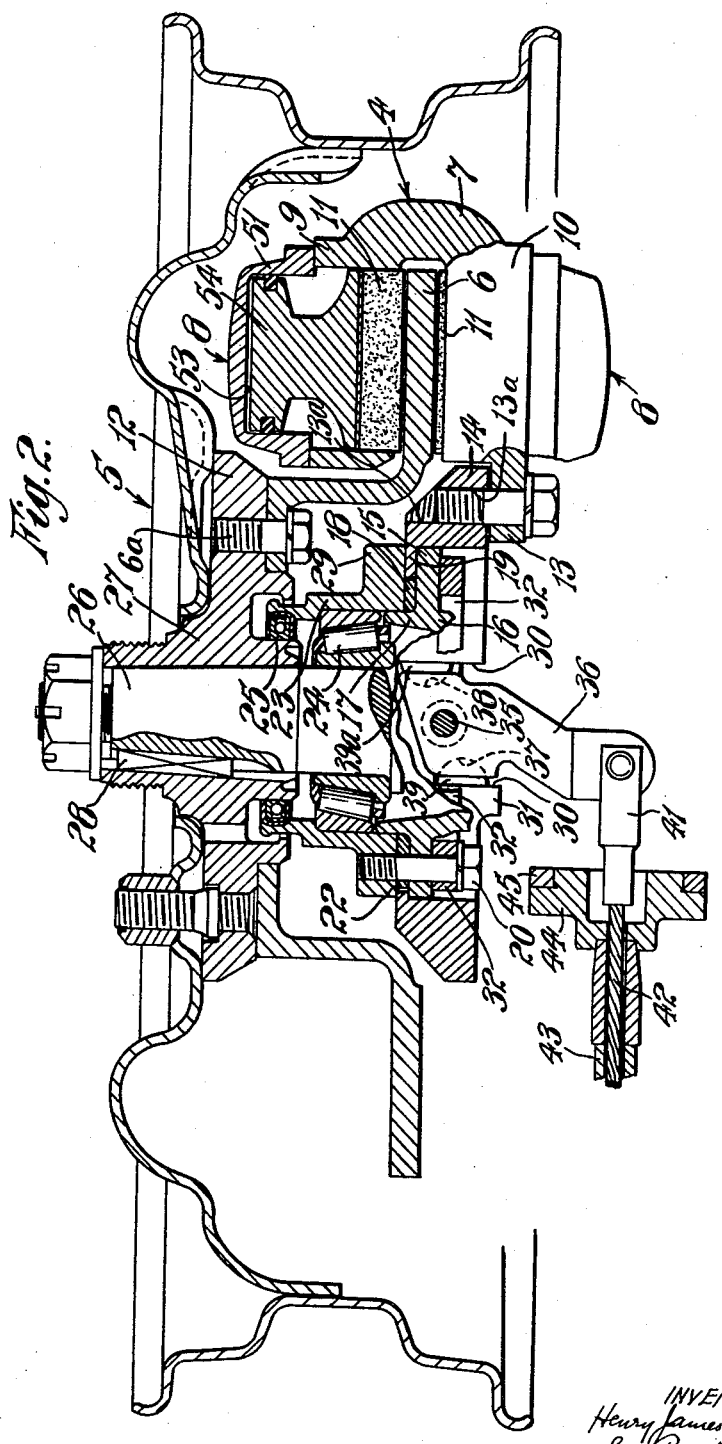
Figure 3:
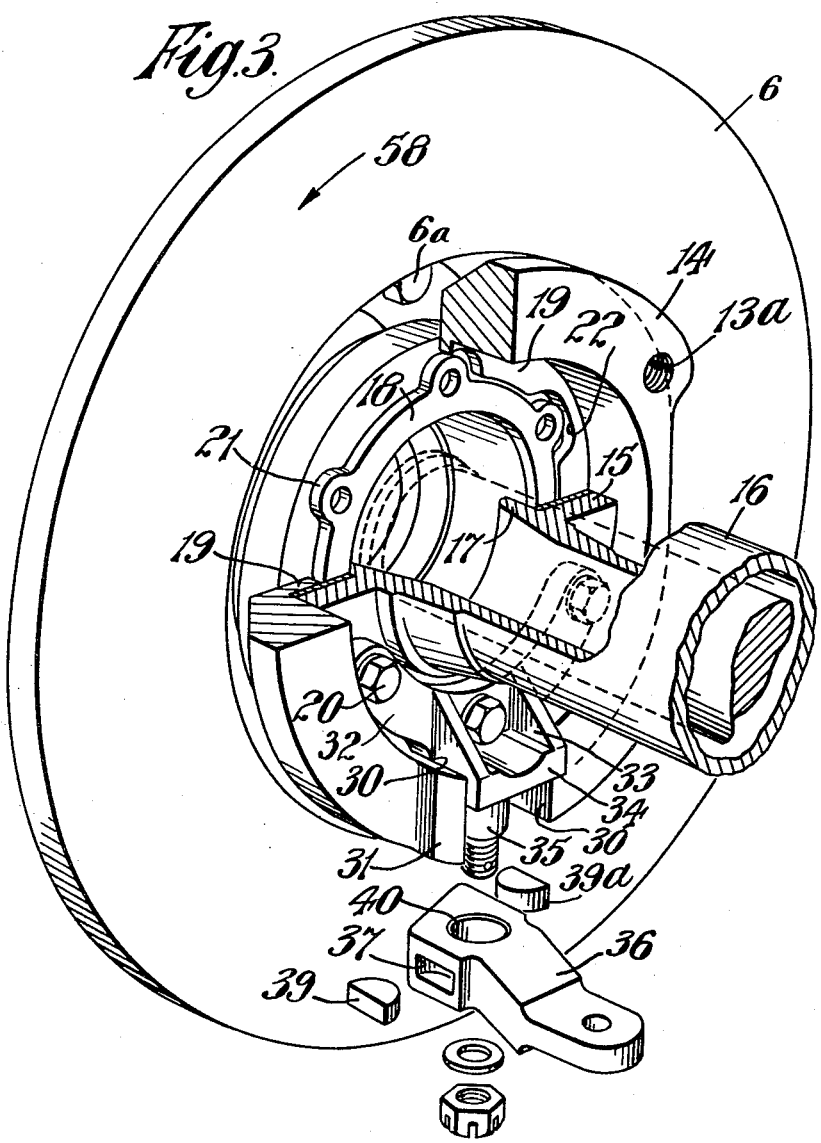
Figure 4:
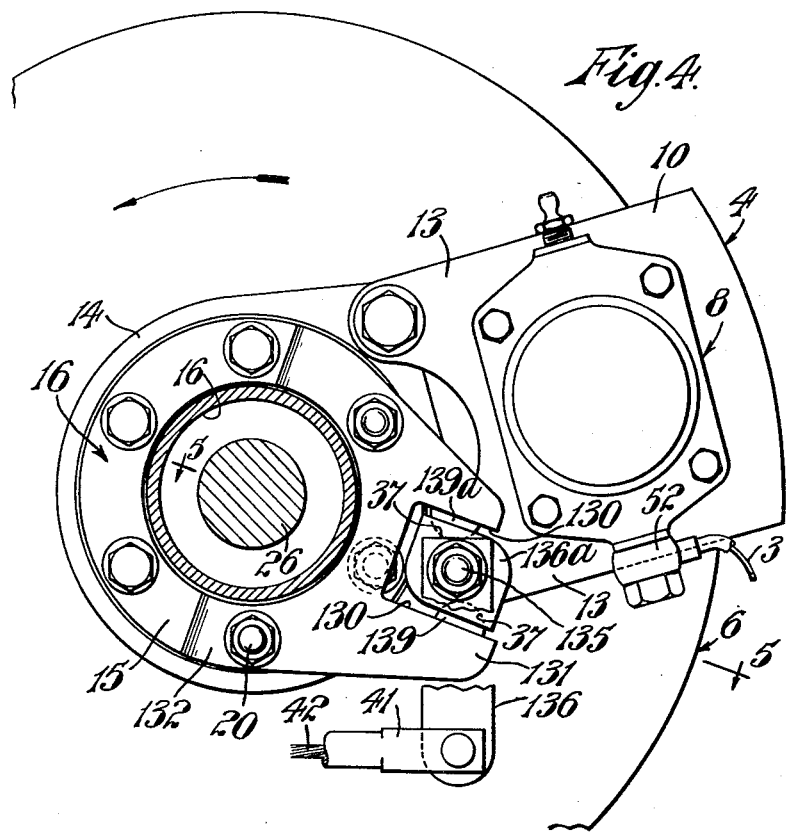
Figure 5:
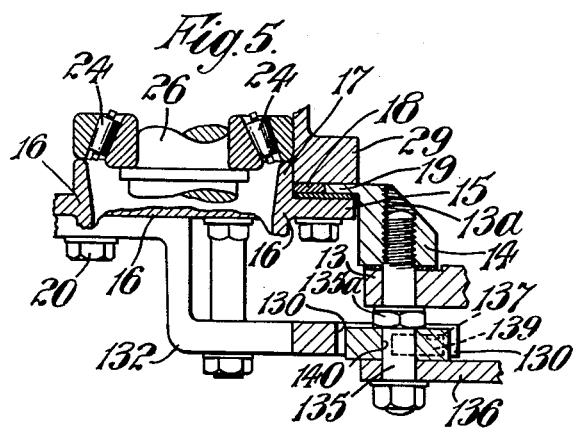

A better understanding of the invention may be obtained from the following description when this is read with reference to the accompanying drawings, of which:

FIGURE 1 is a side elevation, partly in section, and partly diagrammatic, of a braking system according to the invention, FIGURE 2 is a section of a servo brake taken substantially on the line 2—2 of FIGURE 1, with certain portions broken away or omitted for the sake of clarity, FIGURE 3 is a perspective, partly exploded view of the servo brake of FIGURES 1 and 2, FIGURE 4 is a partial side elevation similar to FIGURE 1 of a modification thereof, and FIGURE 5 is a section on the line 5—5 of FIGURE 4, with certain parts again broken away.

As shown in FIGURES 1 to 3 of the drawings, one form of servo brake system according to the present invention comprises a master-cylinder 1 adapted to be actuated by a foot-pedal 2, and operatively connected by a fluid conduit 3 to the hydraulic disc brake 4 associated with one of the wheels 5 of a motor vehicle. The disc brake 4 is of the type comprising a rotatable disc 6, a caliper-type housing 7 straddling the disc 6 at one location on its periphery and a fluid-pressure operated piston and cylinder mechanism 8 associated with each limb 9, 10 of the caliper 7 and operatively connected to the master-cylinder 1 to force pads 11 of friction material, axially-slidable in the housing 7, into frictional engagement with both sides of the disc 6. The disc 6 is secured by bolts 6a to an annular flange 12 on the hub of the wheel 5 and is rotatable therewith.

The remaining wheel brakes of the vehicle may be of any convenient kind but are preferably of the kind described and claimed in Patent No. 2,790,516 wherein caliper-type housings are fixed against circumferential movement, that is to say, they are bolted to a non-rotatable part of the wheel assembly, such as to the front axle or the housing of the rear axle in the known manner (not shown). As these brakes form no part of the present invention their more-detailed description is not considered to be necessary for the present purpose.

The servo brake has a radial extension 13 on the end of the limb 10, in the normal manner for caliper type brakes and this extension is secured by bolts located in holes 13a to a boss 14 which lies adjacent a radial flange 15 on the rear axle housing 16. The axle housing 16 is extended axially past the flange 15 in the form of an annular lip 17 which is adapted to support and centralize a ring 18 the outer periphery of which is loosely surrounded by a radially-inwardly directed flange 19 on the boss 14 (see FIGURES 2 and 3). The ring 18 is secured to the flange 15 by bolts 20 passed through equi-spaced holes in the ring 18, and at each of these holes the outer periphery of the ring has a substantially semicircular radial projection 21. Coinciding with each projection 21 the flange 19 of the boss 14 has an elongated recess 22 formed in its inner periphery, the recesses 22 being of greater circumferential dimensions than the projections 21. The boss 14 is thus able to move angularly relative to the ring 18 in either direction until one end or the other of the recesses 22 abut the adjacent edges of the projections 21.

The ring 18 and flange 19 are secured between the flange 15 and a bearing sleeve 23 which is secured to, and forms an axial continuation of, the axle housing 16, the sleeve 23 serving to locate and support the bearing 24 and oil seal 25 about the axle 26.

The hub 27 of the wheel 5 is secured by a key 28 to rotate with the rear axle 26 within the bearing 24. The ring 18, flange 15 and bearing sleeve 23 are secured together in co-axial alignment in such a manner that the flange 19 of the boss 14 is freely angularly-movable around the periphery of the ring 18, within the angular limits imposed by the recesses 22, and is held against axial movement in the annular slot between the flange 15 and a flange 29 on the sleeve 23 defined by the axial width of the ring 18.

The boss 14 is a complete annulus on its axially inner side, but on its axially-outer side, at its bottom central position, it has a parallel-sided vertically-disposed axial slot 30 cut deeply into its outer surface, the slot being of substantial circumferential width, and an axially-outwardly extending vertical lip 31 is formed at one edge of the slot.

Immediately above the slot 30, an arcuate plate 32 is secured to the outer side of the flange 15 by bolts 20, the plate 32 having a bracket 33 (FIGURE 3) extending axiallly-outwardly thereof and having its lower horizontal step portion 34 received freely between the axial edges of the slot 30. A pivot pin 35 is secured in the step portion 34 of the bracket 33 and depends vertically downwards midway between the edges of the slot 30.

A servo-actuating, or rocking, lever 36 has its inner end pivotally mounted on the pin 35 and extends axially-outwardly away from the boss 14. The inner end face of the lever 36 is disposed at an angle to the major dimension of the lever, and parallel with this inner face on each lateral side of the rocking lever are formed semi-circular recesses 37, 38 in each of which is disposed a semi-circular flat actuator 39, 39a. The recesses 37, 38 are disposed midway between the upper and lower surface of the lever 36 and are angularly disposed relatively to each other in such a manner that when the rocking lever is pivoted in one direction on the pin 35 the flat surface of the actuators 39, 39a engage the opposite faces of the slot 30 diagonally thereof, i.e., the actuator 39a engages a surface of the slot near its axially inner edge and the actuator 39 engages the surface of the slot at its axially outer edge adjacent the lip 31. These points of engagement are on opposite axial sides of the pivot hole 40, FIG. 3, so that in whichever direction the boss 14 moves relative to the ring 18 the rocking lever 36 will be pivoted in a counter-clockwise direction as seen in the drawings.

To the axially-outer end of the lever 36 is pivoted a clevis 41 to which is secured the end of a flexible cable 42, the outer casing 43 of which is secured in a member 44 secured to a non-rotatable portion of the vehicle, as to a bracket 45 clamped to the axle housing 16. The other end of the cable 42 is pivotally secured to the lower end 46 of the foot-pedal lever 2, by a clevis 47, the end 46 of the lever 2 projecting on the opposite side of the foot-pedal pivot 48 to the pedal 49, so that when the lever 2 is rotated in a counter-clockwise direction (as seen in FIGURE 1) to apply the brake by actuation of the master cylinder 1, the lower end 46 of the lever moves in the opposite direction to the pedal 49 and tends to slacken the flexible cable 42. The adjacent end of the sheath 43 of the cable 42 is anchored in a bracket 50 suitably secured to a non-rotatable portion of the vehicle.

The master cylinder 1 is, as has been described, connected to the piston and cylinder mechanism 8 of the pilot brake by a conduit 3 which enters the cylinder 51 through a banjo connection 52 secured thereto. Pressure-fluid from the connection 52 enters a space 53 (FIGURE 2) between the head of a piston 54 and the base of the cylinder 51, and when the master cylinder 1 is actuated, the pressure in the space 53 forces the piston 54 axially outwardly in the cylinder 51, in which it is fluid-tightly slidable, and presses the associated friction pad 11 into frictional engagement with the disc 6. One such piston and cylinder mechanism 8 is disposed on each side of the disc 6.

The piston actually shown in FIGURE 2 is of a conventional design, but the particular form thereof is not essential to the invention, as piston and cylinder arrangements of any other suitable known type may be substituted therefor. Also, such pistons may, if desired, be supplied with automatic adjusting means and/or positive retraction means, and the friction pads 11 may be either loosely associated therewith or positively secured thereto, all as known in the art. The housing 4 may be of the type permitting the withdrawal of the friction pads 11 in the plane of the disc without dismantling the brake. These features are all well known to those skilled in the art, and as they form no part of the present invention require no detailed description.

In describing the operation of the servo brake, it is to be assumed that the conduit 3, besides leading from the master cylinder 1 to the banjo connection 52 of the piston and cylinder mechanism 8 also leads through a branch 55 (FIGURE 1) to conventional brakes 56 associated with discs 57 rotatable with each of the other three wheels of the vehicle. The brakes 56 are preferably identical with the servo brake of the present invention except that their respective housings are rigidly secured to non-rotatable portions of the vehicle and have no angular movement relative thereto. This is by no means essential, however, and it is within the scope of the invention that the servo brake may be substituted for any one of the conventional brakes 56 in an existing brake installation or may be added to such a conventional system. Such an addition or substitution can be effected without interfering in any way with the balance of the existing brakes 56. Where the servo brake is one of the wheel brakes of the vehicle, it is preferably one of the rear wheel brakes thereof and is shown as such in FIGURE 2 of the drawings.

When the brake pedal 49 is depressed to apply the brakes, the master cylinder 1 is actuated to apply fluid-pressure to the spaces 53 behind the piston 54 in the piston and cylinder devices 8 and to similar spaces in the conventional brakes 56, and all four brakes are accordingly applied.

The frictional engagement of the friction pads with the discs, however, exerts a torque on the brake housings in the direction of the rotation of the discs, and as the housing 4 of the servo brake is secured to the boss 14 which has limited angular movement relative to the axle housing 16, in either direction through the distance defined by the recesses 22 and the projections 21 (FIGURE 3), the torque causes the housing 4 to move angularly in the direction of rotation of the disc, defined in FIGURES 1 and 3 by the arrow 58. This angular movement of the boss 14 causes the lip 31 and the adjacent portion of the edge of the slot 30 to engage the actuator 39 and to pivot the rocking lever 36 to the right, as shown in the drawings. This movement causes the rocking lever 36 to exert a pull on the cable 42 and this, in turn, exerts a pull on the lower end 46 of the brake pedal lever 2 and assists in pivoting that lever into a stronger actuation of the master cylinder, and thus, a firmer application of both the servo brake and the conventional brakes 56.

This servo action is cumulative, the recesses 22 being of such circumferential length relative to the projections 21 that they will not "bottom" in the recesses 22 under the fiercest braking conditions.

Thus, the more strongly the servo brake is applied with the assistance of the servo-operated cable 42, the more strongly will the boss 14 react upon the lever 36 to assist in the actuation of the master cylinder 1 and the consequent firmer application of all the brakes on the vehicle.

If the disc is rotating in a direction opposite to the arrow 58, the boss 14 will move angularly in the direction of rotation of the disc 6, but in this case the actuator 39a will be influenced by the adjacent face of the slot 30. As the actuator 39a is on the inner side of the pivot 35, the lever 36 will still be moved in the same direction as that in which it was moved by the actuator 39, and the cable 42 will thus again be brought under tension to supplement the foot pressure on the pedal 49.

Accordingly the servo action will be effective upon the master cylinder 1 and all four brakes regardless of the direction of rotation of the discs.

Although the invention has been described as comprising the brakes applied to one of the four wheels of the vehicle, it will be obvious to those skilled in the art that a brake 56 could be applied to each of the four wheels and the servo brake be applied to the transmission thereof, e.g. to the propellor, or tail, shaft.

In a slightly modified form of the invention as shown in FIGURES 4 and 5 of the drawings the servo lever 136 is pivotable in the plane of rotation of the disc 6 instead of normally thereto as in the embodiment of FIGURES 1 to 3.

The general lay-out of the servo brake is similar to that of the previous embodiment except that the slot 130 is formed radially into a radially projecting plate 132 which is secured to the outer surface of the flange 15 of the axle casing 16 so that the recess 130 is disposed at an angle of some 60° from the horizontal as viewed in FIGURE 4 and the plate 132 has no angular movement. The plate 132 is arcuately formed at its inner periphery to seat snugly around the base of the flange 15 and extends radially-outwardly in the form of a triangle which is formed with the recess 130 at its apex. The portion 131, corresponding with the lip 31 in the plate 32 of the preceding embodiment, is slightly longer, radially, than the portion on the opposite side of the recess 130.

The ears 13 of the housing 4 are secured to the boss 14 as in the previous embodiment, but the ear lying adjacent and behind the recess 130 is secured by the bolt 135, which is threaded at both ends and has a squared or like portion 135a medially thereof whereby the bolt 135 is first screwed into the hole 13a in the boss 14 to secure the ear 13 firmly thereto before being used as the pivot for the servo arm 136.

An actuator block 136a having diagonally-opposite corners rounded off to a substantial radius, is pivoted on the bolt 135 within the recess 130 and has arcuate recesses 137 cut in the opposite sides thereof lying adjacent the radial sides of the recess 130 and diagonally thereon with respect to the pivot hole 140 therein. Into these recesses flat semi-circular actuators 139 and 139a are inserted so that their flat sides abut the opposite radial sides of the recess 130. The rocking lever 136 is placed on the bolt 135 over the actuator block 136a and is secured thereto as by welding or brazing so that the block 136a and rocking lever 136 pivot in unison. As in the previous embodiment of the invention, the cable 42 is secured to the rocking lever 136 by a clevis 41, and the other end of the cable 42 is secured to the foot pedal lever 2.

When the housing 4 is moved angularly by frictional engagement of the friction pads with the rotating disc, the boss 14 also moves as in the previous embodiment of the invention. The plate 132 remains stationary, however, and the angular movement of the boss 14 thus presses one or other of the actuators 139, 139a against the adjacent side of the recess 130 and pivots the plate 136a and rocking lever 136 about the pivot 135 to tension the cable 42. In the present instance, the rocking lever 136 moves in a plane parallel to the plane of the disc instead of normally thereto as in the case of the lever 36.

As will be evident to those skilled in the art, a rod or the like may be substituted for the cable 42, whilst a hand-lever or the like may be substituted for the pedal 2.

The braking system is not limited in its application to the brakes of four-wheeled vehicles, but is readily applicable to any vehicle having one or more brakes. Furthermore, the servo brake need not necessarily comprise one of the normal wheel brakes, but may quite effectively be a separate brake applied, for instance, to a drum or disc on the transmission shaft of the vehicle.

The servo brake may also be used in braking systems wherein disc brakes are fitted to the front wheels and drum brakes to the rear wheels of the vehicle in the known manner, and it may comprise either one of the disc brakes, one of the drum brakes or an independent brake applied, for example, to the vehicle transmission.

Having now described my invention, what I claim is:

1. A brake system comprising a rotatable element to be braked, a non-rotatable member, a lever pivoted on said non-rotatable member, a friction pad movable to engage said rotatable element, actuating means to move said friction pad into frictional engagement with said rotatable element, means supporting said actuating means and rotatably supported on said non-rotatable member to be rotated on the axis of rotation of said rotatable element through a limited arc by the frictional engagement of said friction pad with said rotatable element during rotation, said supporting means comprising means to engage and pivot said lever upon rotation, manually operable means to transmit actuating force to said actuating means, and means actuated by said lever to add the force transmitted from said rotatable element to the force transmitted by said manually operable means to said actuating means.

2. The brake system of claim 1 in which said non-rotatable member comprises a flange coaxial with said rotatable element and having projections arranged about said axis and said support comprises an annular part rotatable about said axis and having recesses positioned to receive said projections and proportioned to permit limited rotation relative to said non-rotatable member.

3. The brake system of claim 2 in which said means supporting said actuating means has a pair of spaced projections on opposite sides of said lever and actuators on said lever on opposite sides of its pivotal axis engaged by said projections to move said lever in one direction upon rotation of said supporting means in either direction.

4. The brake system of claim 1 comprising at least two vehicle wheels, a disc brake for each wheel connected to said master cylinder and in which one of said disc brakes comprises said disc and support.

5. A disc brake system comprising a rotatable disc, a non-rotatable member, a lever pivoted on said non-rotatable member and having arms extending in opposite directions from its pivotal axis, a friction pad adjacent the braking surface of said disc, a support carrying said friction pad and rotatably mounted on said non-rotatable member to rotate about the axis of said rotatable disc and having a pair of stops on opposite sides of said lever one stop of said pair bearing against one arm and the other bearing against the other arm to pivot said lever in one direction upon movement of said support in either of two opposite directions as said rotatable support is rotated by torque force transmitted from said disc to said support on engagement of said friction pad with said disc, means between said non-rotatable member and said support to limit the relative rotation of said support in either direction on said non-rotatable member, actuating means to force said friction pad into frictional engagement with said disc, manually actuated force applying means comprising force transmitting means responsive thereto connected to said actuating means, and means actuated by said lever to add the force imposed on said lever by the rotation of said support by said disc to said force transmitting means.

6. The brake system of claim 5 in which said non-rotatable member and said support have adjacent members, one of said members having recesses spaced angularly about the axis of rotation of said support and the other member having projections extending into said recesses and proportional to permit limited movement of said support in its rotation.

7. The brake system of claim 5 in which said stops comprise a portion of said support having a slot extending radially relative to the axis of rotation of said support and in which said lever is supported and said lever has a pair of abutment members, one on each arm in complementary relation to the abutment of the other arm, positioned to be engaged and moved by the edges of said slot.

8. A disc brake system comprising a rotatable disc, a non-rotatable member, a lever pivoted on said non-rotatable member, a friction pad positioned to move into frictional engagement with the braking surface of said disc, a support carrying said friction pad and rotatably mounted on said non-rotatable member to rotate about the axis of rotation of said rotatable disc and having a pair of stops bearing on opposite sides of said lever and on opposite sides of its pivotal axis to pivot said lever in one direction upon rotation of said support in either of two opposite directions, fluid operated means on said support to force said friction pad into frictional engagement with said disc and thereby to force said support to rotate with said disc, means to limit the rotation of said support within a limited arc, a master cylinder connected to said fluid operated means, a pedal to operate said master cylinder and means connecting said lever to said pedal to add the force imposed on said support by the engagement of said friction pad with said disc to said brake pedal and master cylinder.

9. The brake system of claim 8, in which said pedal is operatively connected to said master cylinder by a push rod on one side of the pivotal axis of said pedal and said lever is connected to said pedal on the other side of said pivotal axis.

10. The brake system of claim 8 in which said non-rotatable member comprises a housing having a pair of limbs, one on each side of said disc and each limb having a brake pad and a cylinder and piston connected to said master cylinder.

References Cited in the file of this patent

UNITED STATES PATENTS

| | | |
|---|---|---|
| 1,732,309 | Loughead | Oct. 22, 1929 |
| 1,943,842 | Sanford | Jan. 16, 1934 |

FOREIGN PATENTS

| | | |
|---|---|---|
| 561,097 | France | July 27, 1923 |
| 663,403 | Germany | Aug. 6, 1938 |
| 721,875 | Germany | June 20, 1942 |
| 638,332 | Great Britain | June 7, 1950 |
| 725,907 | Great Britain | Mar. 9, 1955 |
| 782,810 | Great Britain | Sept. 11, 1957 |

OTHER REFERENCES

Automotive Industries publication, page 1035–1039, Dec. 18, 1924 issue.